(12) United States Patent
Kliatskine et al.

(10) Patent No.: US 10,509,958 B2
(45) Date of Patent: Dec. 17, 2019

(54) SYSTEMS AND METHODS FOR CAPTURING CRITICAL FIELDS FROM A MOBILE IMAGE OF A CREDIT CARD BILL

(71) Applicant: MITEK SYSTEMS, INC., San Diego, CA (US)

(72) Inventors: Vitali Kliatskine, San Diego, CA (US); Grigori Nepomniachtchi, San Diego, CA (US); Nikolay Kotovich, San Diego, CA (US)

(73) Assignee: MITEK SYSTEMS, INC., San Diego, CA (US)

( * ) Notice: Subject to any disclaimer, the term of this patent is extended or adjusted under 35 U.S.C. 154(b) by 51 days.

(21) Appl. No.: 15/338,203

(22) Filed: Oct. 28, 2016

(65) Prior Publication Data
US 2017/0109574 A1    Apr. 20, 2017

Related U.S. Application Data

(63) Continuation of application No. 14/217,241, filed on Mar. 17, 2014, now abandoned.

(60) Provisional application No. 61/802,069, filed on Mar. 15, 2013.

(51) Int. Cl.
| | | |
|---|---|---|
| *G06Q 40/00* | (2012.01) | |
| *G06K 9/00* | (2006.01) | |
| *G06Q 30/04* | (2012.01) | |
| *G06K 7/10* | (2006.01) | |
| *G06K 7/14* | (2006.01) | |

(52) U.S. Cl.
CPC ..... *G06K 9/00442* (2013.01); *G06K 7/10712* (2013.01); *G06K 7/1413* (2013.01); *G06Q 30/04* (2013.01); *G06K 2209/01* (2013.01)

(58) Field of Classification Search
CPC ................................... G06K 9/34; G07C 5/00
USPC .................... 382/181; 340/425.5; 705/34
See application file for complete search history.

(56) References Cited

U.S. PATENT DOCUMENTS

| | | | |
|---|---|---|---|
| 5,326,959 A | 7/1994 | Perazza | |
| 5,761,686 A | 6/1998 | Bloomberg | |
| 5,920,847 A * | 7/1999 | Kolling | G06Q 20/02 705/40 |
| 6,038,351 A | 3/2000 | Rigakos | |
| 6,038,553 A | 3/2000 | Hyde, Jr. | |
| 6,070,150 A * | 5/2000 | Remington | G06Q 20/04 705/34 |
| 6,282,326 B1 * | 8/2001 | Lee | H04N 1/4097 382/275 |

(Continued)

FOREIGN PATENT DOCUMENTS

| | | |
|---|---|---|
| KR | 20040076131 A | 8/2004 |
| KR | 1020070115834 A | 12/2007 |

(Continued)

OTHER PUBLICATIONS

International Search Report issued in related International Application No. PCT/US2011/056593 dated May 30, 2012 (3 pages).

*Primary Examiner* — Oluseye Iwarere
(74) *Attorney, Agent, or Firm* — Procopio, Cory, Hargreaves & Savitch LLP; Noel C. Gillespie

(57) ABSTRACT

The embodiments herein focus on improving recognition accuracy of these fields on credit card bills by detecting and identifying critical fields on a credit card, extracting the data from the critical fields and comparing the data with known data on a payor, payee and biller.

16 Claims, 7 Drawing Sheets

(56) References Cited

U.S. PATENT DOCUMENTS

| | | | |
|---|---|---|---|
| 6,735,341 B1 | 5/2004 | Horie et al. | |
| 6,807,294 B2 | 10/2004 | Yamazaki | |
| 6,947,610 B2 | 9/2005 | Sun | |
| 6,985,631 B2 | 1/2006 | Zhang | |
| 7,020,320 B2 | 3/2006 | Filatov | |
| 7,331,523 B2 | 2/2008 | Meier et al. | |
| 7,377,425 B1 | 5/2008 | Ma et al. | |
| 7,426,316 B2 | 9/2008 | Vehvilainen | |
| 7,478,066 B2 * | 1/2009 | Remington | G06Q 20/04 705/40 |
| 7,593,595 B2 | 9/2009 | Heaney, Jr. et al. | |
| 7,606,741 B2 | 10/2009 | King et al. | |
| 7,949,176 B2 | 5/2011 | Nepomniachtchi | |
| 7,953,268 B2 | 5/2011 | Nepomniachtchi | |
| 7,978,900 B2 | 7/2011 | Nepomniachtchi et al. | |
| 7,983,468 B2 | 7/2011 | Ibikunle et al. | |
| 7,996,317 B1 | 8/2011 | Gurz | |
| 8,000,514 B2 | 8/2011 | Nepomniachtchi et al. | |
| 8,118,216 B2 | 2/2012 | Hoch et al. | |
| 8,121,948 B2 * | 2/2012 | Gustin | G06Q 20/10 705/39 |
| 8,180,137 B2 | 5/2012 | Faulkner et al. | |
| 8,233,714 B2 * | 7/2012 | Zuev | G06K 9/00469 382/180 |
| 8,339,642 B2 | 12/2012 | Ono | |
| 8,688,579 B1 * | 4/2014 | Ethington | G06Q 20/0425 705/42 |
| 8,861,883 B2 * | 10/2014 | Tanaka | G06T 5/003 382/105 |
| 9,786,011 B1 * | 10/2017 | Engelhorn | G06Q 40/08 |
| 2002/0012462 A1 | 1/2002 | Fujiwara | |
| 2002/0023055 A1 * | 2/2002 | Antognini | G06K 1/121 705/40 |
| 2002/0041717 A1 | 4/2002 | Murata et al. | |
| 2002/0046341 A1 * | 4/2002 | Kazaks | G06Q 20/04 713/182 |
| 2002/0077976 A1 * | 6/2002 | Meyer | G06Q 20/04 705/40 |
| 2002/0080013 A1 * | 6/2002 | Anderson, III | G07C 5/008 340/425.5 |
| 2002/0120846 A1 * | 8/2002 | Stewart | G06Q 20/04 713/168 |
| 2002/0143804 A1 * | 10/2002 | Dowdy | G06F 17/30253 715/255 |
| 2003/0086615 A1 | 5/2003 | Dance et al. | |
| 2003/0161523 A1 | 8/2003 | Moon et al. | |
| 2003/0177100 A1 | 9/2003 | Filatov | |
| 2005/0065893 A1 | 3/2005 | Josephson | |
| 2005/0091161 A1 * | 4/2005 | Gustin | G06Q 20/04 705/43 |
| 2005/0097046 A1 | 5/2005 | Singfield | |
| 2005/0141028 A1 * | 6/2005 | Koppich | G06F 16/93 358/1.15 |
| 2005/0143136 A1 | 6/2005 | Lev et al. | |
| 2005/0196071 A1 | 9/2005 | Prakash et al. | |
| 2005/0220324 A1 | 10/2005 | Klein et al. | |
| 2005/0261990 A1 | 11/2005 | Gocht et al. | |
| 2006/0045342 A1 * | 3/2006 | Kim | G06K 9/2054 382/182 |
| 2006/0045379 A1 | 3/2006 | Heaney et al. | |
| 2006/0088214 A1 * | 4/2006 | Handley | G06K 9/00469 382/176 |
| 2006/0140504 A1 | 6/2006 | Fujimoto et al. | |
| 2006/0164682 A1 | 7/2006 | Lev | |
| 2006/0177118 A1 | 8/2006 | Ibikunle et al. | |
| 2006/0210192 A1 | 9/2006 | Orhun | |
| 2006/0242063 A1 * | 10/2006 | Peterson | G06Q 20/04 705/42 |
| 2006/0291727 A1 | 12/2006 | Bargeron | |
| 2007/0053574 A1 | 3/2007 | Verma et al. | |
| 2007/0076940 A1 | 4/2007 | Goodall et al. | |
| 2007/0084911 A1 | 4/2007 | Crowell | |
| 2007/0118391 A1 * | 5/2007 | Malaney | G06Q 10/00 382/229 |
| 2007/0206877 A1 | 9/2007 | Wu et al. | |
| 2007/0214078 A1 * | 9/2007 | Coppinger | G06Q 20/10 705/39 |
| 2007/0288382 A1 | 12/2007 | Narayanan et al. | |
| 2008/0062437 A1 | 3/2008 | Rizzo | |
| 2008/0183576 A1 | 7/2008 | Kim et al. | |
| 2008/0249931 A1 * | 10/2008 | Gilder | G06Q 20/04 705/39 |
| 2008/0249936 A1 * | 10/2008 | Miller | G06Q 20/102 705/40 |
| 2009/0092322 A1 | 4/2009 | Erol et al. | |
| 2009/0108080 A1 * | 4/2009 | Meyer | G06Q 20/14 235/494 |
| 2009/0185241 A1 | 7/2009 | Nepomniachtchi | |
| 2009/0185736 A1 | 7/2009 | Nepomniachtchi | |
| 2009/0261158 A1 | 10/2009 | Lawson | |
| 2010/0073735 A1 | 3/2010 | Hunt et al. | |
| 2010/0104171 A1 | 4/2010 | Faulkner et al. | |
| 2010/0161466 A1 * | 6/2010 | Gilder | G06Q 20/04 705/34 |
| 2010/0253787 A1 * | 10/2010 | Grant | G06Q 30/0603 348/207.1 |
| 2012/0109792 A1 * | 5/2012 | Eftekhari | G06F 21/31 705/31 |
| 2012/0265655 A1 * | 10/2012 | Stroh | G06Q 40/00 705/30 |
| 2013/0022231 A1 * | 1/2013 | Nepomniachtchi | G06Q 20/042 382/102 |
| 2013/0051610 A1 * | 2/2013 | Roach | G06Q 20/042 382/100 |
| 2013/0120595 A1 * | 5/2013 | Roach | H04N 5/225 348/207.1 |
| 2013/0148862 A1 * | 6/2013 | Roach | G06Q 40/02 382/112 |
| 2013/0155474 A1 * | 6/2013 | Roach | G06Q 20/322 358/505 |
| 2013/0311362 A1 * | 11/2013 | Milam | G06Q 20/102 705/40 |
| 2014/0108456 A1 * | 4/2014 | Ramachandrula | G06F 16/583 707/779 |
| 2014/0188715 A1 * | 7/2014 | Barlok | G06Q 20/102 705/40 |
| 2014/0254887 A1 * | 9/2014 | Amtrup | G06K 9/00469 382/112 |
| 2014/0258838 A1 * | 9/2014 | Evers | G06F 17/243 715/234 |
| 2014/0281871 A1 * | 9/2014 | Brunner | G06F 17/243 715/226 |
| 2015/0012382 A1 * | 1/2015 | Ceribelli | G06Q 50/01 705/26.35 |
| 2015/0012442 A1 * | 1/2015 | Ceribelli | G06Q 20/1085 705/45 |
| 2015/0142545 A1 * | 5/2015 | Ceribelli | G06Q 30/0222 705/14.23 |
| 2015/0142643 A1 * | 5/2015 | Ceribelli | G06Q 30/04 705/39 |
| 2017/0185972 A1 * | 6/2017 | Bozeman | G06Q 20/04 |
| 2018/0240081 A1 * | 8/2018 | Doyle | G06Q 40/00 |

FOREIGN PATENT DOCUMENTS

| | | |
|---|---|---|
| WO | 2006075967 A1 | 7/2006 |
| WO | 2006136958 A2 | 12/2006 |

* cited by examiner

SYSTEMS AND METHODS FOR CAPTURING CRITICAL FIELDS FROM A MOBILE IMAGE OF A CREDIT CARD BILL

BACKGROUND

1. Field of the Invention

The embodiments described herein relate to processing images captured using a mobile device, and more particularly to identifying critical fields in a credit card remittance coupon and extracting the content therein.

2. Related Art

Financial institutions which issue credit cards frequently offer a service known as a balance transfer, where a customer with a balance due on a credit card can transfer some or all of the outstanding balance from one credit card to another credit card. Customers typically transfer balances from one card to another to obtain a lower interest rate, more favorable payment schedule, or other benefits offered by a credit card for carrying a balance with a particular financial institution. A balance transfer may also be similar to a cash advance, where a customer can transfer a sum of money from their credit card into their bank account, resulting in a balance due on the credit card but giving the customer cash in their bank account.

In some situations, the customer already holds the credit card where the balance is being transferred, while in other situations, the customer may be opening a new credit card and transferring a balance to the new credit card. Banks often compete with other banks to advertise lower interest rates and favorable payment terms on a balance transfer. However, it is often difficult for a customer to find out which balance transfer offers are available and what the terms of the balance transfer will be, as many balance transfer terms are dependent on the amount of the balance being transferred or the credit rating of the customer.

The balance transfer process is cumbersome for both the customer and the bank. The customer must obtain several different pieces of information, including the customer's name, contact information, credit card number, the current balance and the applicable interest rates that are applicable to the balance. If the balance is being transferred to a bank account, other information may be needed, such as a bank account number and routing number. A bank may also want to evaluate the credit history of the customer to determine whether to accept the balance transfer application, in which case the customer will need to provide even more information, such as a social security number, driver's license number or additional financial information.

Once this information is entered into an application for a balance transfer, the receiving bank evaluates the information to determine whether to accept the balance transfer request. This process may take a significant amount of time—generally several days. Once accepted, it may take several more day or even weeks before the money is transferred.

Therefore, there is a need for streamlining the process of applying for and processing financial offers, such as credit card balance transfers.

SUMMARY

Embodiments described herein provide for the identification of critical fields on a document which provide high probabilities of accurately reading a content on the document image. By improving recognition accuracy of these fields on documents such as a credit card bill, the remainder of the content on the bill can be read with high confidence.

Products which use image processing techniques to read bills, including such bill categories as insurance, utility, mortgage etc., use a set of rules which apply to all (or majority) of bills within each category. One of the most important tasks behind the mobile image capture science is understanding and utilization of the category-specific rules in form of specialized OCR, cross-validation between different document fields, usage of postal barcodes etc. For example, knowledge that the document is a credit card bill (CCB) allows the system to read its Account Number and other critical fields using both data on the bill and the code-line and in some cases the code-line only. This reduces the error rate on critical fields by 2-5 times compared to "generic" bills.

The following fields on CCBs are considered critical on CCBs: Account Number, Balance Due, Payee ZIP-code and Biller's Name.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding and shall not be considered limiting of the breadth, scope, or applicability of the embodiments. It should be noted that for clarity and ease of illustration these drawings are not necessarily made to scale.

Figure 1:
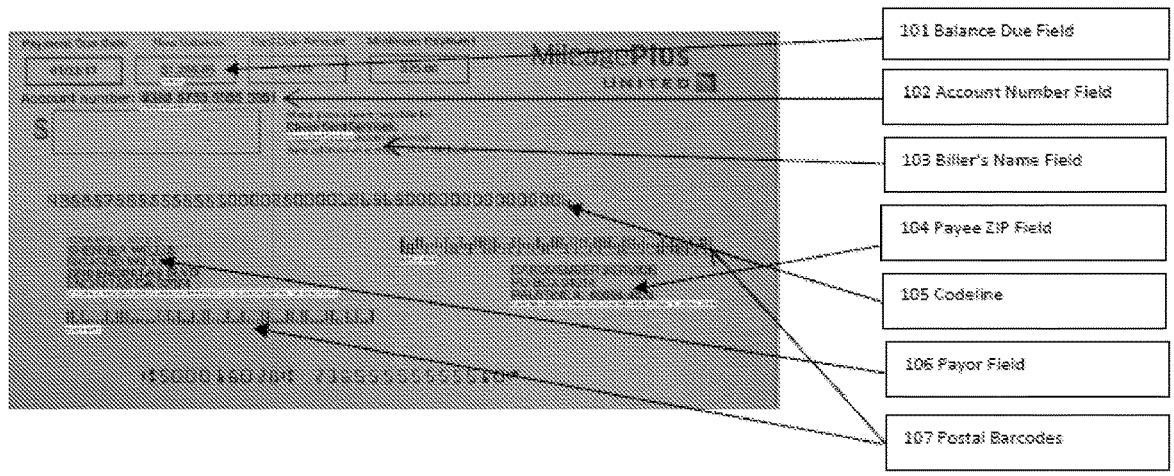
FIG. 1 is an image of a credit card bill identifying one or more critical fields, according to embodiments.

The various embodiments mentioned above are described in further detail with reference to the aforementioned figured and the following detailed description of exemplary embodiments.

DETAILED DESCRIPTION

Embodiments described herein pertain to systems and methods for identifying and capturing critical fields on an image of a document such as a credit card bill. Each critical field is identified as such based on the resulting likelihood that if the critical field can be identified, the remaining fields on the document can also be identified with a high confidence. This therefore improves the overall ability to capture and identify content from the document and utilize it for various applications.

The following fields on CCBs are considered critical for BT application:
  Account Number
  Balance Due
  Payee ZIP-code
  Biller's Name The embodiments herein focus on improving recognition accuracy of these fields on credit card bills. The following document fields are being captured and used to facilitate finding, identification, and recognition of critical fields:
  105 Codeline
  106 Payor Block
  107 Postal Barcodes I. Capturing Account Number from Credit Cards Bills
Keyword-Based Search AccountNumber field has a unique set of keyword phrases which allow to identify the field's location on about 90% of CCBs. In remaining 10%, the keyword cannot be found due to some combination of poor image quality, small font, inverted text etc. Below we discuss methods which can be used when keywords cannot be found.

The most frequent keyword phrases are: Account, Account Number and Account No. Some keyword phrases could be printed in a single text line or in two consecutive lines. It should be noted that the set of keywords on CCBs is more restrictive than in the general case. For example, such phrase as "Policy Number" (frequent on insurance bills) is not used.

Keywords are searched for in the full-page OCR result using Fuzzy Matching technique. For example, if OCR result contains "Account Nomber", then the "Account Number" keyword will be found with confidence of approximately 920 (out of 1000 max) because 12 out of 13 non-space characters are the same as in the "Account Number". On FIG. 2, the keyword 201 "Account Number" was found.
Format-Based Search The data format of Account Number field on CCBs is more restrictive than in the "generic" bill case both in terms of its length and character set. More limitations apply in case of Major Credit Cards, see section 6.

The data format of Account Number field on CCBs is more restrictive than in the "generic" bill case both in terms of its length and character set.

For example, the following definition of Account Number format covers majority of ALL bills:
  Total number of characters: from 4 to 22
  Number of low-case alpha characters (excluding 'x'): 0
  Number of upper-case alpha characters (excluding 'X'): from 0 to 4
  Number of punctuations (spaces, dashes): from 0 to 4
  Number of masking characters (X, x, *, #): from 0 to 12
In contrast, the following (narrower) definition of Account Number format covers majority of credit card bills:
  Total number of characters: from 10 to 20
  Number of low-case alpha characters (excluding 'x'): 0
  Number of upper-case alpha characters (excluding 'X'): 0
  Number of punctuations (spaces, dashes): from 0 to 4
  Number of masking characters (X, x, *, #): from 0 to 12
The data could be found in proximity to keywords found in 1.1 or directly in the full-page OCR result.

Each location of data is assigned the format-based confidence, which reflects how close data in the found location matches the expected format. On FIG. 2, the data 202 was found.
Cross Validation Against Codeline On CCBs, Account Number is always included into the Codeline. This allows to use cross-validation technique.

On CCBs, AccountNumber is always included into the Codeline. This allows to use cross-validation technique, which works as follows:

Account Number is captured using keywords and/or data formats definition, see 1.1-1.2. Let us refer to an Account Number result as A, see 202 on FIG. 2. Codeline is captured using an OCRA/OCRB recognition module. Let us refer to codeline string as B, see 202 on 203 on FIG. 2.

Substrings of B are compared to A after removing spaces, dashes and other non-essential punctuation marks in both A and B. The matching is done using Fuzzy Matching technique, explained in [1]. The matching threshold is configured in such a way that a single-character difference between A and substring of B is allowed. Additional differences involving characters which are frequently misrecognized are also allowed. For example, the difference between '3' recognized in a particular place of A and '8' recognized in the corresponding place inside B is excused because '8' is frequently recognized as '3'. Another example of frequently misrecognized characters are '6' and '5'.

If Step (c) finds a substring C which fuzzy-matches A within the threshold explained above, then A is replaced by the C. The explanation of preferring codeline recognition results to Account Number captured from the bill is that former is significantly more accurate than the latter.

Figure 2:
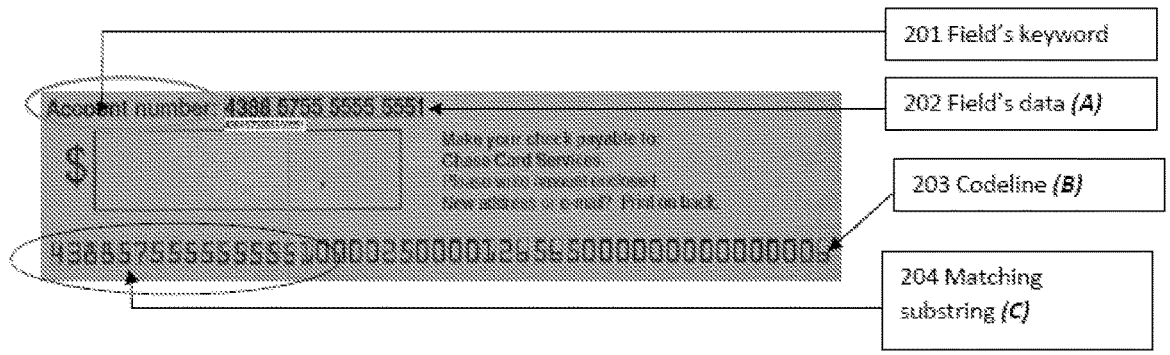
FIG. 2 is an image of a portion of the credit card bill used for cross-validation of an account number field against a Codeline, according to embodiments.
Figure 3:
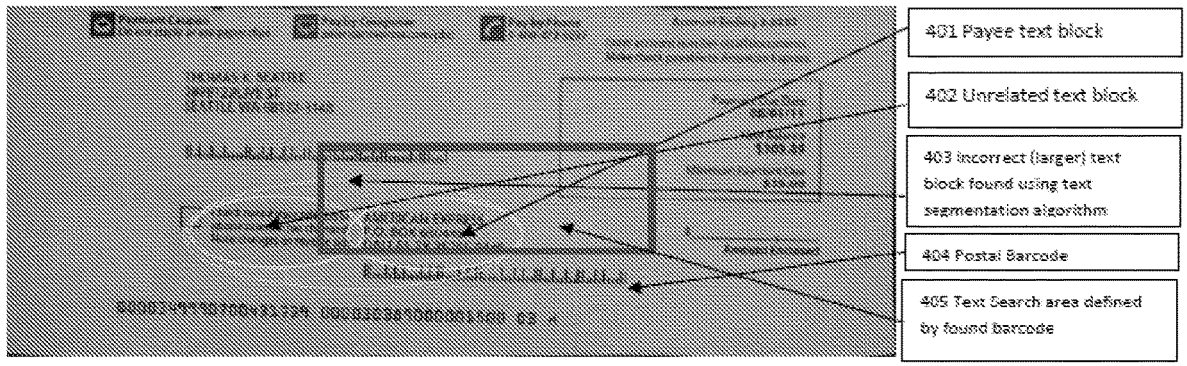
FIG. 3 is an image of the credit card bill identifying a payee block which is not sufficiently isolated from other text, causing text block segmentation issues, according to embodiments.

Consider FIG. 2 as an example. Step 1.1 found the keyword 201, step 2.2 found the data 202 (A) next to the keyword. The codeline 203 (B) was also found. Let us assume that A is "4888 5755 5555 5561" and B is "43885755555555510000250000126565000000000000006". The Fuzzy Matching technique (c) will detect that the substring 204 C="4388575555555551" has 2 differences against A, involving pairs ('8' and '3') and ('6' and '5'). Since both pairs are frequently misrecognized (see above) the string C will be accepted by step (c). As a result, step (d) will correct A to "4388 5755 5555 5551."
AccountNumber's Confidence Score Each result found by 1.1-1.3 is assigned a confidence score which reflects how confident the system is that it found a correct field result. In computing the confidence score, a weighted linear combination of the following factors is used:
  the keyword finding confidence, see 1.1
  the format-based confidence, see 2.2
  the score reflecting geometrical alignment between keyword found in 1.1 and data found by 1.2. For example, if the data is located immediately to the right from the keyword (with no characters in between) like 201 and 202 on FIG. 2, or the data is located immediately below the keyword (again, with no characters in between), the score reaches its maximum value of 1000. Various deviation from such alignment or presence of characters in between cause lower scores.
  if field's data could be found in the codeline (see 1.3), the confidence gets an additional boost depending on how well the data and codeline match.

The weight of each individual factor is the overall field confidence score is established experimentally.
Cross Validation Against Biller's Database Available Biller's databases contain information about thousands of billers, including their postal addresses, names and account number formats. This information allows to cross-validate AccountNumber and other critical fields on CCBs, as described in [1]. In case the highest-confidence AccountNumber result matches Payee information included into the Biller's db, the system will accept the result. However, if it doesn't the system may reconfigure the AccountNumber format (see 1.2) and try to find it again by repeating steps 1.1 and 1.2 or just 1.2 when the new format is significantly more restrictive than the default one.

Usage of Specialized OCR

Since the format of Account Number field is more restrictive than in the "generic" bill case, it allows to make OCR more specialized and thus to achieve higher recognition accuracy. For example, a typical OCR error of misrecognition of '2' and 'Z', 'O' and '0', '1' and 'I', '5' and 'S' could be easily avoided if we know that the character is alpha or numeric.

Usage of Multiple OCR Engines

The system can use multiple OCR engines to recognize and re-recognize some characters. A typical obstacle to using multiple OCR engines is a difficulty in deciding which one produced correct result. For the same reason as 1.3, making such decision becomes significantly simpler on CCBs.

Using "Last Digits" Hints

If a user enters 1 or more of last digits in the account number, the system can utilize such knowledge to improve data capturing accuracy. The mechanism of using such hint is similar to imposing limitations on the field format (see 1.1). If a user enters one or more of last digits in the AccountNumber, the system can utilize such knowledge to improve data capturing accuracy. The mechanism of using such hint is similar to imposing limitations on the field format (see 1.2)

Identification of Major Credit Cards

Since there are very few major credit cards among all credit card billers, it is possible to identify the exact major credit using relatively simple and fast form identification methods. Such methods are based on finding logos, certain keyword and overall location of text blocks on the document. Handling of mobile images for the purpose of Form Identification is described in [2].

Once the system identified that a bill is one of the major credit cards', it can use several rules that apply to such bills (but do not apply to CCBs in general), see Section 6.

Cross Validation Against Biller's Database

Available Biller's databases contain information about thousands of billers, including their postal addresses, names and account number formats. This information allows to cross-validate account number and other critical fields on CCBs.

II. Section 2 Capturing Payee ZIP-Code from Credit Cards Bills

In order to find the Payee ZIP-code and also to ensure its correctness, the system first finds all address blocks on the bill, corrects those using postal barcodes, then identifies which one is Payee and takes its ZIP-code field as the result.

2.1 Using Text Blocks to Find Possible Addresses

Usually, addresses are printed as left-, right- or center-justified text blocks isolated from the rest of document text by significant white margins. Based on this information, the system may detect potential address locations on a document by building text block structure. One way of doing that is to apply text segmentation features available in most of OCR systems, such as Fine Reader Engine by ABBYY.

2.2 Using Postal Barcode to Isolate Address Text Blocks

Figure 4:
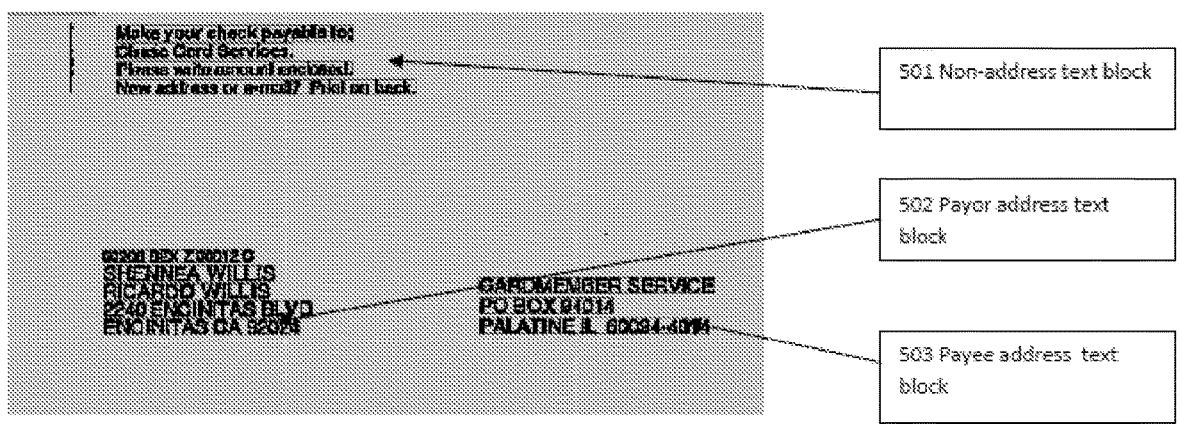
FIG. 4 is an illustration of a processed image of a credit card bill identifying a last text line in one or more address boxes, according to embodiments.

On some bill layouts, where the address blocks are not sufficiently isolated, the text segmentation method 2.1 may need a correction using postal barcodes, as explained on FIG. 4. The bill shown on FIG. 4 has Payee block 401 printed too close to an unrelated text block 402, which may cause a failure of text segmentation algorithm, resulting in wrong text block 403 being found. To correct the problem, the system can use location of postal barcode 404 to define a search area above (shown as 405) and below the barcode, thus isolating the correct Payee address block 401 from the adjacent text block 402.

2.3 Filtering-Out the Text Blocks by the City/State/ZIP Line

In most of US addresses, the bottommost line contains City/State/ZIP information. The system can utilize this knowledge by filtering out the text blocks found in 2.1-2.2 which do not have enough alphas (to represent City and State), do not contain any valid state (which is usually abbreviated to 2 characters) and/or do not contain enough numbers in the end to represent Zip-code.

Figure 5:
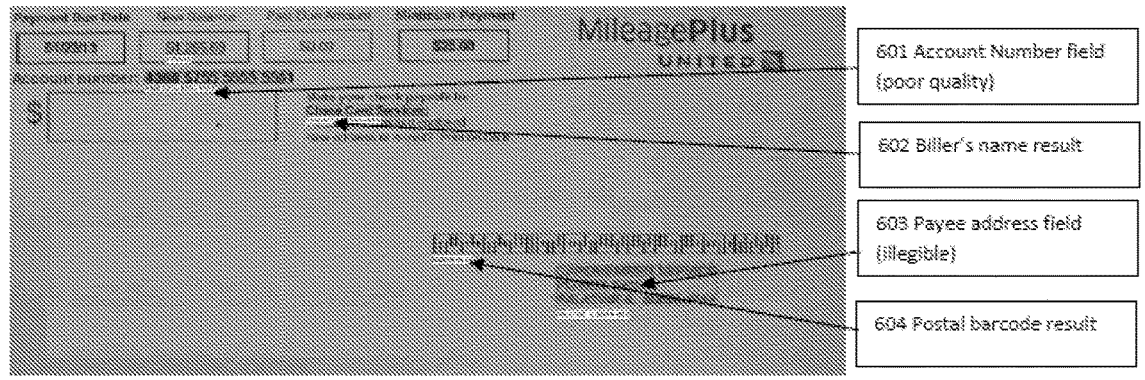
FIG. 5 is an image of the credit card bill highlighting a payment history deduction tool to improve accuracy of capturing critical fields, according to embodiments.

Consider the bill shown on FIG. 5: the last text line in two true address text blocks 502 (Payor) and 503 (Payee) contain information which satisfies the conditions described above. Even if OCR makes several recognition errors, the Fuzzy Matching algorithm will establish a high degree compliance with expected format. On the other hand, the last line of text block 501 does not meet the expected format (for example, none of the last characters in its last row is numeric). Therefore, the text block 501 will be removed from further consideration whereas blocks 502 and 503 will be both recognized and classified as Payee/Payor as explained in 2.7

2.4. Using Postal Database and Fuzzy Matching to Interpret Addresses

Once address candidates are selected using 2.1-2.3, the BillPay system can build the entire address block starting with City/State/ZIP at the bottom line and including 1-3 upper lines as potential Name and Street Address components. Since the exact format of the address is not well-defined (it may have 1-4 lines, be with or without Recipient name, be with or without POBOX etc.), the system has to make multiple address interpretation attempts to achieve satisfactory interpretation of the entire text block.

In order to compare OCR results with the data included into the Postal db, the Fuzzy Matching mechanism is used. For example, if OCR reads "San Diego" as "San Dicgo" ('c' and 'e' are often misrecognized), Fuzzy Matching will produce matching confidence above 80% between the two, which is sufficient to achieve the correct interpretation of OCR result.

2.5. Using Postal Database to Correct Addresses

After the interpretation of the address block was achieved, the individual components will be corrected to become identical to those included into the Postal db. Optionally, the discrepancies between address printed on the bill and its closest match in Postal db could be corrected by replacing invalid, obsolete or incomplete data as follows:

Correcting ZIP+4

For example, 92128-1284 could be replaced by 92128-1234 if the latter is a valid ZIP+4 additionally confirmed by either the street address or postal barcode, see 2.8

Adding missing ZIP+4

For example, 92128 could be replaced by 92128-1234 if the latter is a valid ZIP+4 additionally confirmed by either the street address or postal barcode, see 2.8

Correcting invalid street suffixes, such as "Road" into "Street" if the "Street" suffix can be confirmed by Postal db while the "Road" one cannot.

2.6 Computation of the Address Confidence

The system will assign a confidence value on the scale from 0 to 1000 to each address it finds. Such confidences could be assigned overall for the entire address block or individually to each address component (Recipient Name, Street Number, Apartment Number, Street Name, POBOX Number, City, State and Zip). The larger values indicate that the system is quite sure that if found, read and interpreted the address correctly. The component-specific confidence reflects the number of corrections in this component required by process 2.5. For example, if 1 out of 8 non-space characters was corrected the "CityName" address component (e.g. San Dicgo" v. "San Diego"), the confidence of 875 may be assigned (1000*7/8). The overall confidence is a weighted linear combination of individual component-specific confidences, where the weights are established experimentally.

2.7 Identification of Payee vs. Payor

After one or more of address blocks have been captured as described in 2.1-2.6, the system must make a determination as to which one is Payee's and/or Payor's. The following factors help in such determination:

Presence of POBOX (it's much more likely to be a Payee than Payor if POBOX is present)

Location within the document (e.g. Payee is somewhat more likely to be printed at the bottom, especially in the right/bottom corner)

Inclusion of certain words in the Recipient name item (some words like "Corporation", "Department", "Center" etc. indicate Payee)

Inclusion of frequent names in the Recipient name item (e.g. "John" is more likely indicate Payor than Payee)

Adjacency to Postal barcodes, see 2.8. If one and only one of two found addresses is adjacent to a postal barcode, it is likelier to be Payor's.

Optional Payor hint, as explained in 2.9

Also, in a case when 3 or more addresses were found (and therefore more than one address block compete for either Payee or Payor) the address block adjacent to postal barcode is given a preference.

2.8 Using Postal Barcode Reader

Postal barcodes are often printed on bills and they help to improve accuracy of address capture.

The system uses Postal barcodes for 4 purposes:

To help in Payee vs. Payor identification (see 2.7)

To help choose the correct Payee or Payor when two found address blocks compete for the same field result To correct ZIP-codes or capture them if they cannot be read from the image due to poor quality. For example (see FIG. 6), if the address is 603 illegible but the barcode 604 containing ZIP+4="60094-4014" was found, the system can recreate City, State and ZIP fields from the barcode.

To better detect address candidates, see 2.2

2.9 Using Payor Hint

Payor hint contain information about Payor (i.e. the bill's recipient). The system can use such information as one of the factors in Payee vs. Payor identification (see 2.7)

2.10 Using "Payment History" Hint

Such hint contains information about previously paid bills in the account. The system can use such information to significantly increase accuracy of capturing critical fields. Depending on which and how many critical field values were included into the hint, the field capture error may be reduced by 20-98% for repeating billers.

Figure 6:
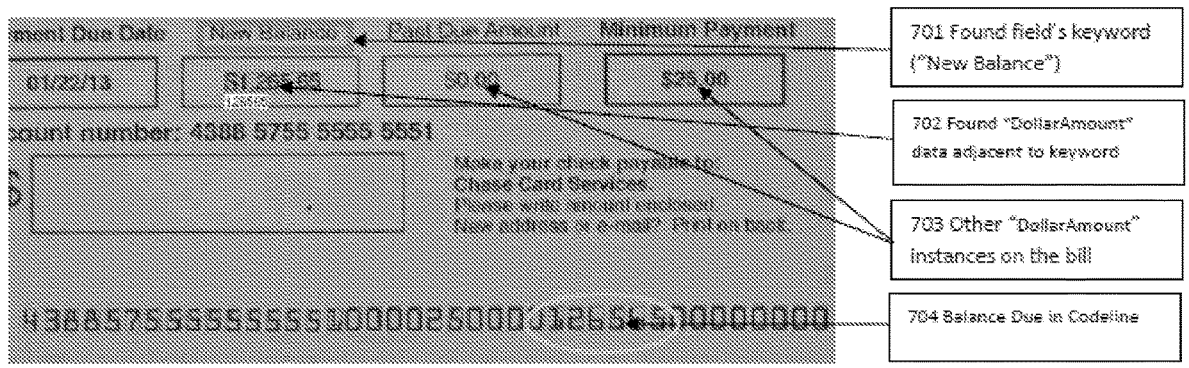
FIG. 6 is an image of a portion of the credit card bill highlighting a balance due critical field, according to embodiments.

As an illustration, consider FIG. 6. Assume that the Bill Pay system made one recognition error (out of 16 digits) on the Account Number field 601 and recognized it as "4388 6755 5555 5551" as well as two errors (out of 17 characters) in the Biller's Name 602 and recognized it as "Chasc Card Servlces". Let us assume that the system made no errors in capturing the Payee ZIP-code 603 (out of 9 digits). In this particular example, even though the field itself cannot be read due to poor quality, the Postal Barcode 604 was captured correctly and populated the City, State and ZIP fields of Payee block.

If the "payment history" for this transaction included correct reading of Account Number ("4388 5755 5555 5551"), correct Biller's Name ("Chase Card Services") and correct biller's ZIP code ("60094-4014"), a standard fuzzy matching procedure will identify that 39 of 42 characters in all 3 critical fields combined are matched correctly, resulting in about 92% matching confidence. If the system uses a threshold of 90% for this matching (which could be made configurable), the errors in Account Number and Biller's Name may be corrected automatically.

2.11 Using Biller's Database

Available Biller's databases contain information about thousands of billers, including their postal addresses, names and account number formats. This information allows to cross-validate payee information and other critical fields on CCBs, see [1].

III. Section 3 Capturing Balance Due from Credit Cards Bills 3.1 Keyword-Based Search Balance Due field has a unique set of keyword phrases which allow to identify the field's location on about 90% of CCBs. In remaining 10%, the keyword cannot be found due to some combination of poor image quality, usage of small font, inverted text etc.

The most frequent keyword phrases are:

Balance Due
New Balance
New Balance Total
Outstanding Balance
Balance
Total Balance
Previous balance
Current Balance
Balance At Billing These and other keywords could be printed in a single text line or two adjacent lines (except for single-word ones)

Figure 7:
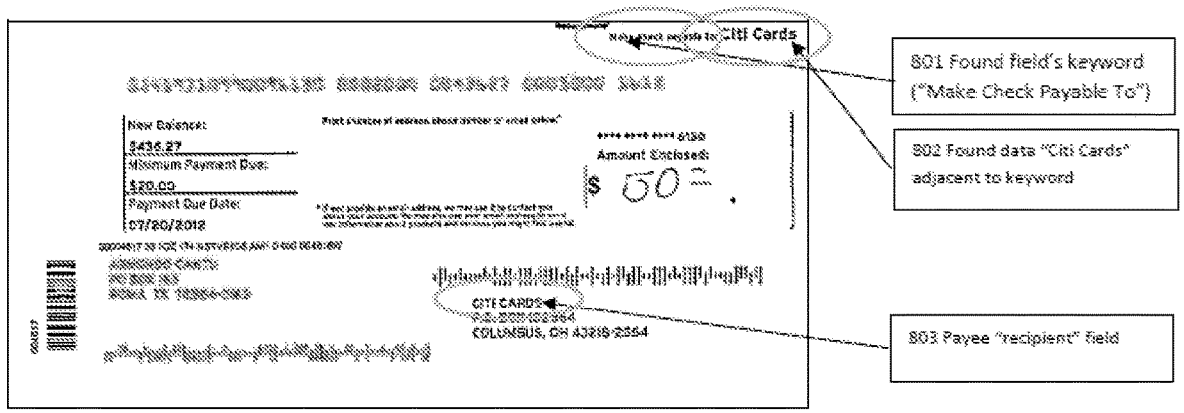
FIG. 7 is an illustration of a method of identifying a biller's name field on different portions of the credit card bill, according to embodiments.
Figure 7:
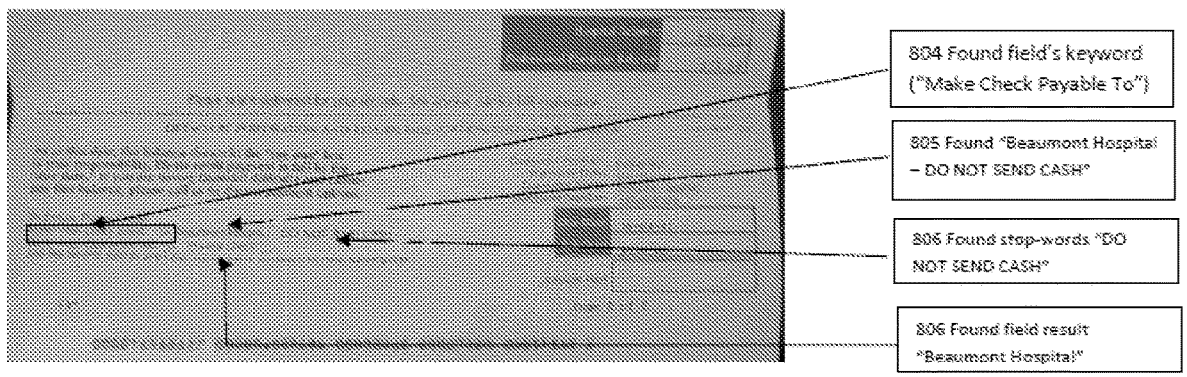

Example on FIG. 7 shows a VISA Mileage Plus credit card bill with the "New Balance" keyword 701

Keywords are searched for in the OCR result using Fuzzy Matching technique. For example, if OCR result contains "Bajance Due" then the "Balance Due" keyword will be found with confidence of 900 (out of 1000 max) because 9 out of 10 non-space characters are the same as in the "Balance Due".

3.2 Format-Based Search

Balance Due field has so-called "DollarAmount" format, which is one of pre-defined data formats explained in [1]. Data format is used by Bill Pay system in combination with Keyword-based search 3.1 to further narrow down the set of candidates for the field.

Example on FIG. 7 shows a VISA Mileage Plus credit card bill with the BalanceDue data 702 adjacent to keyword 701. You can also see other instances of data with "DollarAmount" format in 703.

Each location of data found in proximity to keywords found in 3.1 is assigned the format-based confidence, which reflects how close data in the found location matches expected format (in this case, "DollarAmount").

3.3 Cross-Validation Against Codeline

On CCBs, Balance Due is always included into the Codeline. This allows to use cross-validation technique similar to one explained in 1.2 for Account Number field.

Example on FIG. 7 shows a VISA Mileage Plus credit card bill with the BalanceDue data 702 cross-validated using Codeline substring 704

3.4 Usage of the Largest Amount

If regular keyword-based search (see 3.1) doesn't yield results, the system can use the largest of all amounts included into the bill and found by 3.2 as long as it can be validated against the codeline Example on FIG. 7 shows a VISA Mileage Plus credit card bill with the BalanceDue data 702 is the largest of 3 "DollarAmount" fields (702 and 703). It can also be cross-validated using Codeline substring 704

3.6. Confidence Score

Each result found by 3.1-3.4 is assigned a confidence score which reflects how confident the system is that it found correct field result. A weighted linear combination of the following factors is used

- the keyword finding confidence, see 3.1
- the format-based confidence, see 3.2
- the score reflecting geometrical alignment between keyword found in 3.1 and data found by 3.2. For example, if the data is located immediately below the keyword (with no characters in between) like 701 and 702 on FIG. 7, or the data is located immediately to the right from the keyword (again with no characters in between) the score reaches its maximum value of 1000. Various deviation from such alignment or presence of characters in between cause lower scores.
- if field's data could be found in the codeline, the confidence gets an additional boost depending on how well the data and codeline match.
- the confidence is additionally boosted for larger amounts and penalized for smaller ones.

The weight of each individual factor in the overall field confidence score is established experimentally.

IV. Section 4 Capturing Biller's Name from Credit Cards Bills

4.1 Using Keywords

Figure 8:
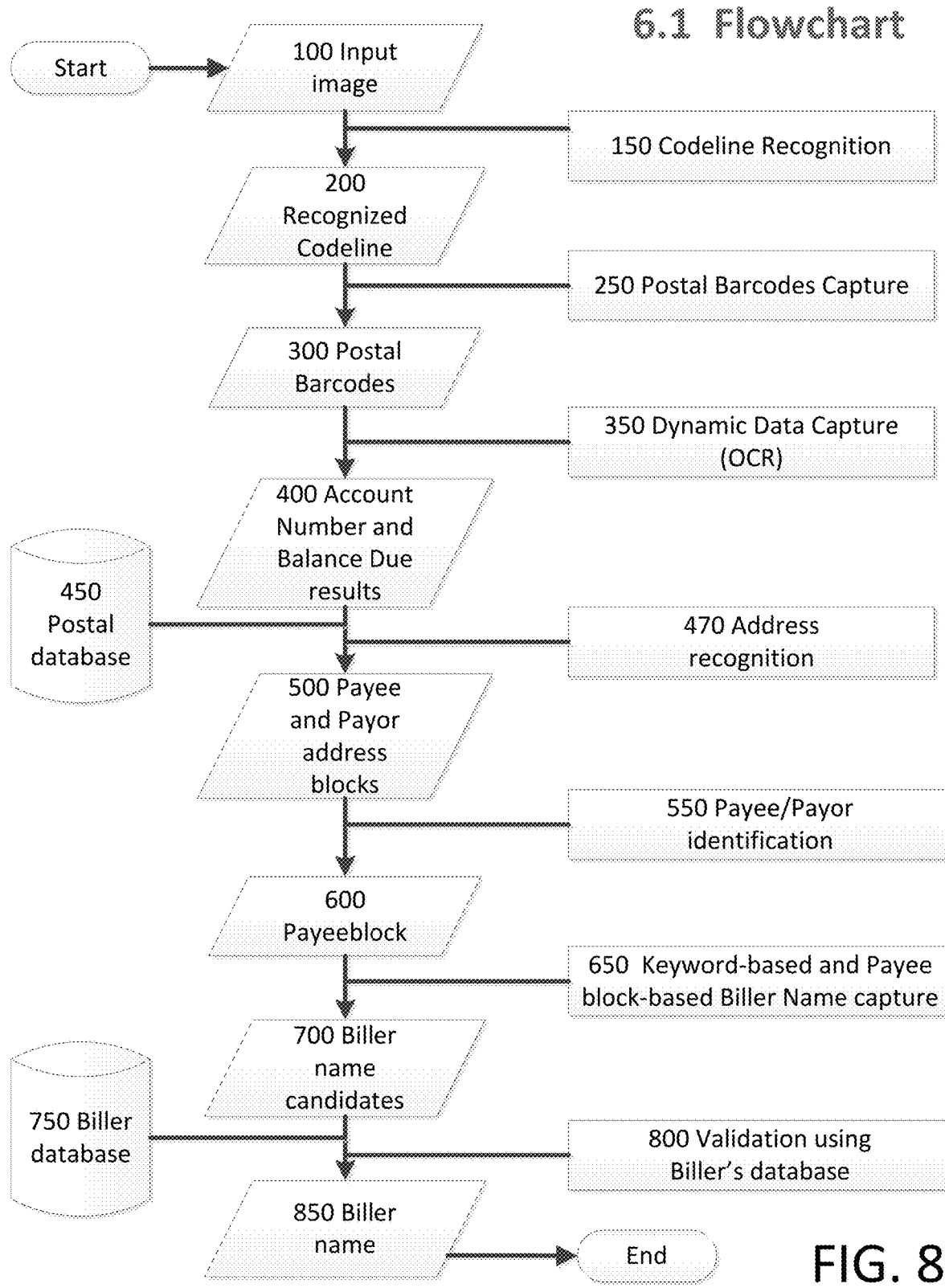
FIG. 8 illustrates a method of identifying one or more fields on the credit card statement, according to one embodiment of the invention.

The Biller's name is often indicated on a bill by certain keyword phrases, the most frequent of which are:

- Make check payable to
- Make payment to
- Made payable to
- Remit Payments to
- Check made payable to
- Check or money order payable to On FIG. 8, Biller's Name is pointed to by the keyword phrase "Make Check Payable To" (801)

4.2 Finding Field Adjacent to Keyword

Once one or more such keywords were found, the system will try to find actual biller's name in the proximity of the keyword using the following sequence of attempts:

1. Text immediately to the right of found keyword(s). Stop if text is found, otherwise proceed to #2
2. Text immediately below found keyword(s). Stop if text is found, otherwise proceed to #3
3. Check if the Payee block is located below the keyword. If yes, take its topmost line.

On FIG. 8, the Biller's Name "Citi Cards" 802 is located immediately to the right of keyword 801

4.3 Cross-Correlation Against the "Recipient" Field in the Payee Address

On a large portion of CCBs the biller name is also included into the "recipient" field (the upmost line of the address block) of the Payee address block. Therefore, the system will use the Payee's "recipient" field to cross-correlate (via Fuzzy Matching) with various biller's name alternatives found in 4.2 to choose the best candidate.

On FIG. 8, the Biller's Name "Citi Cards" 802 closely correlates with (or is identical to, if no OCR errors were made) Payee "recipient" field 803

4.4. Using "Stop Words" to Limit the Field

When the Biller's name is found according to 4.1-4.2, sometimes an unrelated text is being added to it because it is printed to the right from actual Biller's name. To identify and remove unrelated text, the system uses a set of so-called "stop-words", which are commonly used to give the Payor some additional instruction related to paying the bill.

The list of commonly used "stop-words" include (but not limited to) the following phrases

- remit to
- please do not
- please return
- and return
- and indicate
- do not send cash
- in US funds
- and include
- and mail with
- and mail to
- please write
- please make
- please include
- and write your
- thank you
- in US dollars
- and this payment
- in the enclosed
- and write account
- detach and exclude
- payment due date Consider the following example of using "stop-words". On FIG. 8, the Biller's Name found according to 4.1-4.2 on the right from found keyword 804 is 805 "Beaumont Hospital—DO NOT SEND CASH". Then analysis finds a "stop-word" 806 ("DO NOT SEND CASH"), truncates the field result 805 before the "stop-word", hence producing the correct result 806 ("Beaumont Hospital")

4.5. Confidence Score

Each result found by 4.1-4.4 is assigned a confidence score which reflects how confident the system is that it found correct field result. A weighted linear combination of the following factors is used

- the keyword finding confidence, see 4.1
- the geometrical relationship between keyword found in 4.1 and data found by 4.2
- cross-correlation to the Payee "recipient" field, established by 4.3

The weight of each individual factor is established experimentally.

4.6 Using Biller's Database

All candidates for biller's name captured from the bill according to 4.1-4.4, get cross-correlated against all biller's names located at the captured biller's Zip-code (see Section 2). If one of the entries in Biller's db produces high match confidence against one of results 4.1-4.4, the latter will be chosen as the correct biller's name, see [1]. The matching threshold is configurable. If none of Biller db entry matches to field results found by 4.1-4.3, the result with the highest confidence score 4.5 will be used.

Section 5 Capturing AccountNumber on Major Credit Cards

There is a set of rules applicable to all Major Credit Cards (MCC for short) which help to increase recognition accuracy on such bills.

5.1 Limitations of AccountNumber's Leading Digits

MCCs (Visa, MasterCard, AmEx, Diners, and Discover) have well-defined account number formats. Their account numbers start with a particular digit or a narrow range of digits (say, Visa always starts with '4', MasterCard with "51"-"55" and so on). This limitation translates in narrowing the AccountNumber's format, see 1.2

5.2 Limitations of AccountNumber's Length

AccountNumber's length is also restricted. The length depends on the credit card, 16 digits length is the most often case. This limitation also translates in narrowing the AccountNumber's format, see 1.2

5.3 Mod 10 Rule (LUHN Formula)

Account Number field on MCCs satisfied LUHN Formula (Mod 10) rule, which we included below for reference.

The following steps are required to validate the account number on MCCs:

Step 1: Double the value of alternate digits of the account number beginning with the second digit from the right (the first right-hand digit is the check digit.)

Step 2: Add the individual digits comprising the products obtained in Step 1 to each of the unaffected digits in the original number.

Step 3: The total obtained in Step 2 must be a number ending in zero (30, 40, 50, etc.) for the account number to be validated.

5.4 Detection of Account Number Entirely by Codeline

If the fact that bill is issued by a major credit card was established, the system can in most cases find the field directly in Codeline w/o a necessity to do the OCR. This becomes possible if a single substring in the codeline satisfies all restrictions 5.1-5.3

IV. Capturing Biller's Address from Credit Cards Bills

Using Text Blocks to Find Possible Addresses

Usually, addresses are printed as left-, right- or center-justified text blocks isolated from the rest of document text by significant white margins. Based on this information, the system may detect potential address locations on a document by building text block structure.

Filtering the Text Block by the City/State/ZIP Line

In most of US addresses, the bottommost line contains City/State/ZIP information. The system can utilize this knowledge by filtering out the text blocks found in 2.1 which do not have enough alphas (to represent City and State), do not contain any valid state (which is usually abbreviate to 2 characters) and/or do not contain enough numbers in the end to represent Zip-code.

Using Postal Database and Fuzzy Matching to Interpret Addresses

Once address candidates are selected using 2.1 and 2.2, the system can build the entire address block starting with City/State/ZIP at the bottom line and including 1-3 upper lines as potential Name and Street Address components. Since the exact format of the address is not well-defined (it may have 1-4 lines, be with and without names, be with and without POBOX etc), the system has to make multiple address interpretation attempts to achieve satisfactory interpretation of the entire text block.

In order to compare OCR results with the data included into the Postal db, the Fuzzy Matching mechanism is used. For example, if OCR reads "San Diego" as "San Dicgo" ('c' and 'e' are often misrecognized), Fuzzy Matching will produce matching confidence above 80% between the two, which is sufficient to achieve the correct interpretation of OCR result.

Using Postal Database to Correct Addresses

After the interpretation of the address block was achieved, the individual components will be corrected to become identical to those included into the Postal database.

Computation of the Address Confidence

The system will assign a confidence value on the scale from 0 to 1000 to each address found above. Such confidences could be assigned overall for the entire address block or individually to each address component (recipient name, street number, apartment number, street name, POBOX number, City, State and ZIP). The larger values indicate that the system is quite sure that if found, read and interpreted the address correctly.

Identification of Payee vs. Payor

After one or more of address blocks have been captured, the system must make a determination of which one is Payee and Payor. The following factors help in such determination:

Presence of POBOX (it is much more likely to be a Payee than Payor if POBOX is printed).

Location within the document (e.g. Payee is somewhat more likely to be printed at the bottom, especially in the right/bottom corner)

Inclusion of certain words in the Recipient name item (some words like "Corporation" indicate Payee)

Inclusion of frequent names in the Recipient name item (e.g. "John" is more likely indicate Payor than Payee)

Adjacency to Postal to barcodes (if more than 1 block competes for either Payee or Payor, the one adjacent to a barcode wins).

Using Postal Barcode Reader

Postal barcodes are often printed on bills and they help to improve accuracy of address capture.

The system uses Postal barcodes for 3 purposes:

To help in Payee vs. Payor identification (see 2.6)

To correct ZIP-code

To better detect address candidates

Using Payor Hint

Payor hint contain information about Payor (i.e. the bill recipient). The system can use such information for Payee vs. Payor identification (see also 2.6)

Using Payee Hint

Payee hint contain information about existing billers in the account. The system can use such information to significantly increase accuracy of capturing critical fields. Depending on which and how many critical field values were included into the hint, the field capture error may be reduced by 20-98% for the pre-existing (i.e. repeating) billers.

Using Biller's Database

Available Biller's databases contain information about thousands of billers, including their postal addresses, names and account number formats. This information allows to cross-validate payee information and other critical fields on CCBs.

III. Capturing Balance Due from Credit Cards Bills

Keyword-Based Search

Balance Due field has a unique set of keywords which allow us to identify the field's location on about 90% of CCBs. In remaining 10% the keyword cannot be found due to some combination of poor image quality, usage of small font, inverted text etc.

Cross Validation Against Codeline

On CCBs, Balance Due is always included into the Codeline. This allows us to use a cross-validation technique by comparing content from two different fields that should be identical.

Usage of the Largest Amount

If regular keyword-based search (see 3.1) does not yield results, the system can use the largest of all amounts included into the bill as long as it can be validated against the codeline.

IV. Capturing Biller Name from Credit Cards Bills

Using the "Recipient" Field in the Payee Address

On a large portion of CCBs the biller name is included into the "recipient" field in the Payee Address. Therefore the system will use the "recipient" field as a candidate for the biller's name Using Keywords The Biller's name is often indicated on a bill by certain keywords, like "Pay to", "Make your check payable to" etc. Once one or more such keywords were found, the system will try to find actual biller's name in the proximity of the keyword using the following sequence of attempts:
 1. Text immediately to the right of found keyword(s). Stop if text is found, otherwise proceed to #2.
 2. Text immediately below found keyword(s). Stop if text is found, otherwise proceed to #3.
 3. Check if the Payee block is located below the keyword. If yes, take its topmost line.

The system will use the text found in 1-3 above as another candidate for the biller's name in addition to the one presented in the section immediately above.

Using Biller's Database

All candidates for biller's name get cross-correlated against all possible billers located at the biller's Zip code found (see Section 2). The entry in Biller's db with the highest match confidence will be chosen as the correct biller.

V. Capturing Account Number on Major Credit Cards

There is a set of rules applicable to all Major Credit Cards (MCC for short) which help to increase recognition accuracy on such bills.

Limitations on Character Set

Account Number field in all MCCs is purely numeric (unlike say Insurance bills which may include alphas).

Limitations of Account Number's Leading Digits

MCCs (Visa, MasterCard, AmEx, Diners, and Discover) have well defined account number formats. Their account numbers start with a particular digit or a narrow range of digits (say, Visa always starts with '4', MasterCard with "51"-"55" and so on).

Limitations of Account Number's Length

Account number length is also well restricted. The length depends on the credit card, 16 digits length is the most often case.

Mod 10 Rule (LUHN Formula)

Account Number field on MCCs satisfied LUHN Formula (Mod 10) rule, which we included below for reference.

The following steps are required to validate the account number:

Step 1: Double the value of alternate digits of the account number beginning with the second digit from the right (the first right-hand digit is the check digit.)

Step 2: Add the individual digits comprising the products obtained in Step 1 to each of the unaffected digits in the original number.

Step 3: The total obtained in Step 2 must be a number ending in zero (30, 40, 50, etc.) for the account number to be validated.

Detection of Account Number Entirely by Codeline

If the fact that bill is issued by a major credit card was established, the system can in most cases find the field directly in Codeline w/o a necessity to do the OCR.

VI. Overall Flowchart of Capturing Critical Fields from Credit Card Bills

Description of Overall Flowchart

Figure 9:
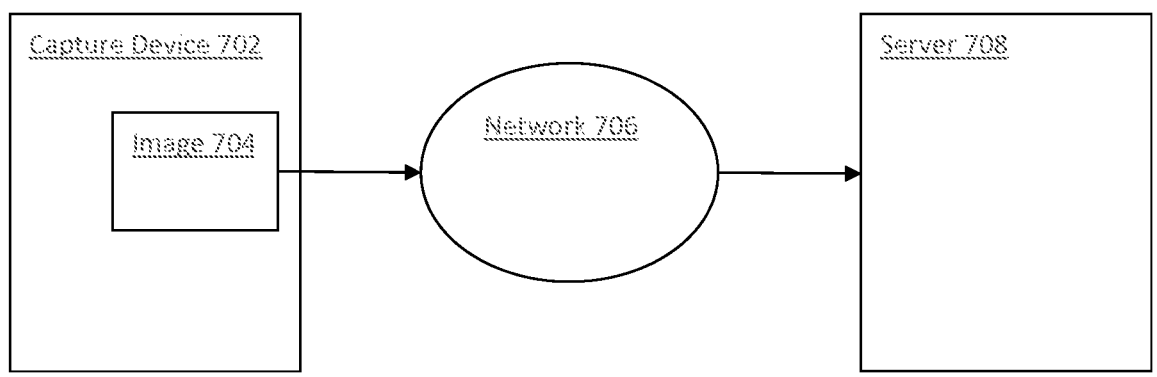
FIG. 9 illustrates a system for capturing and identifying critical fields on a credit card statement, according to one embodiment of the invention.

FIG. 8 is a flowchart of a method of capturing critical fields in a credit card bill, in accordance with embodiments of the invention. In one embodiment, the steps for capturing critical fields include:

100—Input binary image. It is created as a result of processing the mobile color JPG-image of the bill as described in Patent [1].
 150—Codeline recognition.
 200—ASCII string representing result of 150
 250—Postal Barcode recognition
 300—Postal Barcodes
 350—Applying Dynamic Capture module [1] to find alternatives for Account Number and Balance Due based on the field's keywords (such as "Account Number", "Balance Due" etc) and field's format
 400—Final Account Number and Balance Due results based on cross-validation against codeline 200
 450—Postal database
 450—Address recognition and validation using Postal db 450
 500—Payee and Payor address block as a result of 450
 550—Identification of Payee and Payor
 600—Payee block
 650—Finding candidates for Biller Name using keywords and payee
 700—Biller name candidates
 750—Biller database
 800—Validation candidates 700 against database 750
 850—Final Biller name FIG. 9 is one embodiment of a network and system upon which the methods described herein may be implemented, including a capture device 702 which captures an image 704 of a credit card bill, then transmits it over a network 706 to a server 708 for processing. In one embodiment, the capture device 702 also performs one or more of the processing steps described herein in addition to, or instead of, the server 708.

Figure 10:
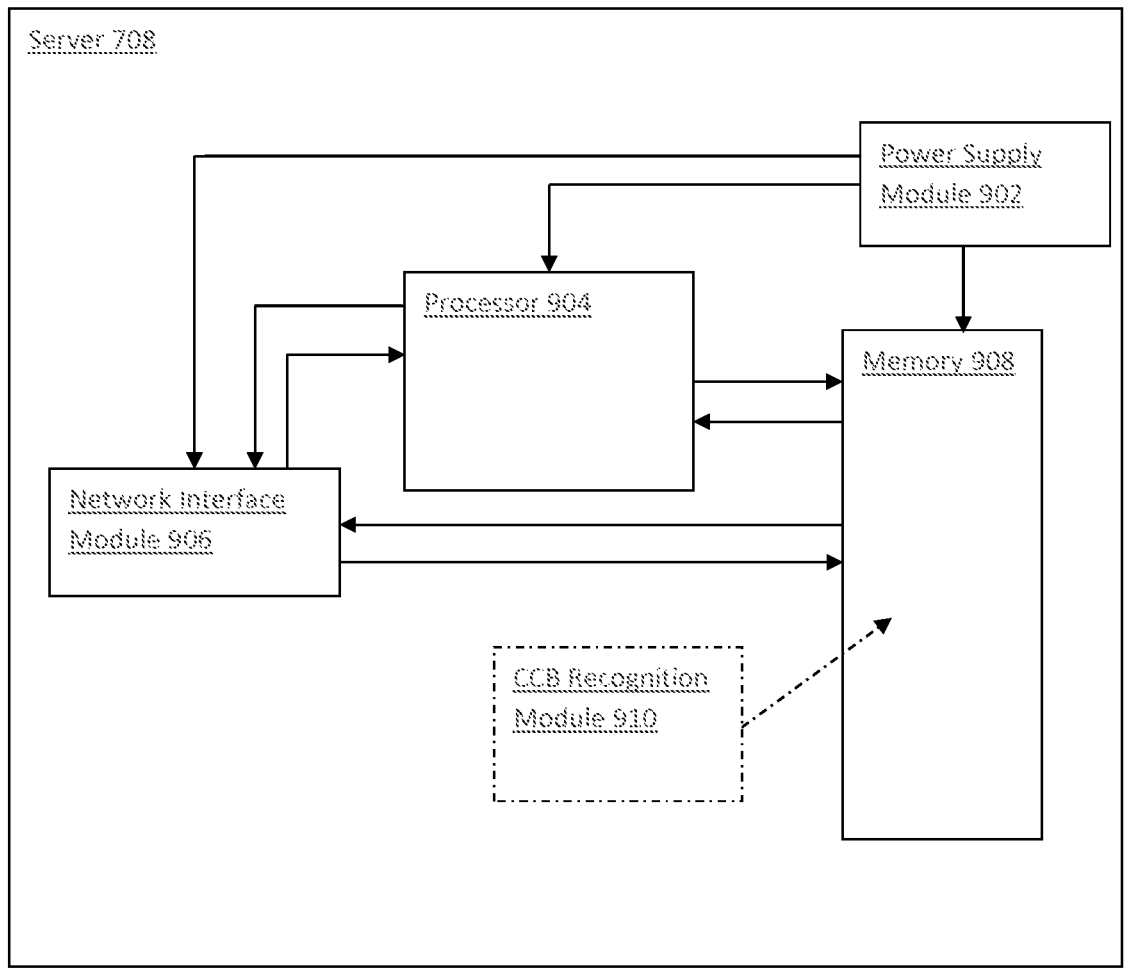
FIG. 10 is a block diagram that illustrates an embodiment of a computer/server system upon which an embodiment of the inventive methodology may be implemented.

FIG. 10 is an embodiment of a computer, processor and memory upon which a mobile device, server or other computing device may be implemented to carry out the methods described herein. The server 708 may include a power supply 902, processor 904, network interface module 906, memory 908 and a CCB recognition module 910 for performing the specific credit card bill recognition and identification steps described herein.

While various embodiments have been described above, it should be understood that they have been presented by way of example only, and not of limitation. The breadth and scope should not be limited by any of the above-described exemplary embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for identifying contents of a credit card bill from an image of the credit card bill, comprising:
    receiving the image of the credit card bill which includes a codeline field;
    identifying, from the image of the credit card bill, at least one field of the credit card bill using at least one of a keyword-based search and a format-based search, wherein the at least one field is not the codeline field;
    extracting, from the received image, content of the at least one identified field;
    capturing codeline content of the codeline field;
    removing nonessential punctuation marks from the captured codeline content;
    cross-validating the extracted content of the at least one identified field against the captured codeline content to determine if the extracted content matches a portion of the captured codeline content; and
    when the extracted content matches,
        replacing the extracted content with the matching portion of the captured codeline content as the identified content of the at least one identified field of the credit card bill; and
        outputting the identified content of the at least one identified field of the credit card bill.

2. The method of claim 1, wherein the keyword-based search identifies the at least one field by identifying a predetermined keyword located near the at least one field.

3. The method of claim 1, wherein the format-based search identifies the at least one field by matching a format of the at least one field with a predetermined format of the at least one field.

4. The method of claim 1, wherein the at least one identified field is the Account Number field which includes an account number associated with the credit card bill.

5. The method of claim 4, wherein the codeline field includes the account number associated with the credit card bill.

6. The method of claim 1, wherein the at least one identified field is the Balance Due field which includes an amount due associated with the credit card bill.

7. The method of claim 6, wherein the codeline field includes the amount due associated with the credit card bill.

8. The method of claim 1, wherein the portion of the captured codeline content is a substring of the captured codeline content.

9. The method of claim 1, wherein prior to determining if the extracted content matches a portion of the captured codeline content, the method further comprises removing spaces, dashes and other nonessential punctuation marks from both the capturing codeline content and the portion of the captured codeline content.

10. The method of claim 1, wherein determining if the extracted content matches a portion of the captured codeline content includes using a matching threshold which allows at most a single-character difference between the extracted content matches a portion of the captured codeline content.

11. The method of claim 1, wherein determining if the extracted content matches a portion of the captured codeline content includes using a matching threshold which allows both a single-character difference and additionally differences involving frequently-misrecognized characters between the extracted content and the portion of the captured codeline content.

12. The method of claim 1, wherein the method further comprises computing a confidence score for the extracted content of the at least one identified field based on a combination of a confidence of the keyword-based search and/or format-based search and whether the extracted content matches a portion of the captured codeline content.

13. The method of claim 12, wherein the confidence score is further computed by determining a geometrical alignment score reflecting the location of a keyword of the keyword-based search relative to the extracted content of the at least one identified field.

14. The method of claim 12, wherein the confidence score increases if a portion of the captured content of the codeline matches the extracted content of the at least one identified field.

15. The method of claim 14, wherein the confidence score depends on a degree of matching between the portion of the captured content of the codeline and the extracted content of the at least one identified field.

16. The method of claim 1, wherein the matching portion of the captured codeline content has a higher accuracy than the extracted content of the at least one identified field.

* * * * *